United States Patent [19]
Shigeo

[11] 3,925,926
[45] Dec. 16, 1975

[54] METHOD AND APPARATUS FOR WATER AND AIR CULTURE OF PLANTS

[75] Inventor: Nozawa Shigeo, Takatsuki, Japan

[73] Assignee: Kyowa Kagakukogyo Kabushiki Kaisha, Japan

[22] Filed: Nov. 8, 1973

[21] Appl. No.: 413,949

[52] U.S. Cl. .................. 47/1.2; 47/38.1; 239/428.5
[51] Int. Cl.² .................... E03C 1/08; A01G 31/00
[58] Field of Search ............ 47/1.2, 38.1; 312/229; 222/64; 239/57, 63, 110, 428.5; 137/386, 391; 251/205, 212

[56] References Cited
UNITED STATES PATENTS

| | | | |
|---|---|---|---|
| 2,051,461 | 8/1936 | Lee | 47/1.2 |
| 2,060,735 | 11/1936 | Krueger | 47/1.2 |
| 2,674,828 | 4/1954 | Tegner | 47/1.2 |
| 2,747,331 | 5/1956 | Steiner | 47/1.2 |
| 2,812,168 | 11/1957 | Kumpman | 239/428.5 |
| 2,855,725 | 10/1958 | Carothers | 47/1.2 X |
| 2,880,549 | 4/1959 | Knipe | 47/38.1 |
| 3,082,960 | 3/1963 | Swan | 239/428.5 X |
| 3,103,763 | 9/1963 | Malchair | 47/1.2 |
| 3,131,064 | 4/1964 | Malchair | 47/1.2 X |
| 3,578,431 | 5/1971 | Ingestad et al | 47/1.2 |
| 3,624,692 | 11/1971 | Lux | 47/1.2 |
| 3,660,933 | 5/1972 | Wong, Jr. | 47/1.2 |
| 3,747,856 | 7/1973 | Knapp | 239/428.5 |

*Primary Examiner*—E. H. Eickholt
*Attorney, Agent, or Firm*—Holman & Stern

[57] ABSTRACT

A method comprising elevating and lowering the liquid level of a culture solution in a plantation vessel to expose a desired amount of root of a plant to air in a wet state for a desired period of time, flowing the culture solution all the time in a correlated fashion with respect to a root portion positioned in the culture solution, and incorporating air into the culture solution to increase the concentration of dissolved oxygen therein, whereby the root of the plant is rendered highly active and free from physiological disorders. The culture solution is further maintained at a temperature most suitable for the growth of the plant. An apparatus for practicing this method is also disclosed.

1 Claim, 9 Drawing Figures

METHOD AND APPARATUS FOR WATER AND AIR CULTURE OF PLANTS

BACKGROUND OF THE INVENTION

Generally, plants are grown in the ground with the help of the energies of the natural environment involving sunlight, water, air and nutrients. Thus, the ground or soil serves as a base for receiving and giving the energies, as a container for storing and controlling them and as a support for the plants. The soil structure differs with the type of soil and the way it is worked and further undergoes complex changes with climate, so that the soil must be handled with versatile techniques including cultivation, sprinkling, furrowing, fertilization, etc., in accordance with the kind of plant, stage of its growth and changes in the environment. However, since the growth of plants is greatly governed by the conditions and type of soil, it is very difficult to provide optimum conditions.

Field crops or plants for which the present method is intended may encounter the following drawbacks when grown by soil culture.

1. Soil moisture

The water held by soil includes adhesion water, capillary water and gravity water, among which physiologically available to field plants is predominantly capillary water, since adhesion water is unavailable while gravity water gives excess moisture and impairs the growth of plants. However, the ratio of capillary water to the porosity of soil varies with the environmental changes to subject the root system of plant to excess or deficiency of the moisture, with the result that most frequently the soil fails to give a particular plant optimum moisture conditions at each stage of its growth. Thus, the water which may be present in the soil is rarely available under the most suitable conditions.

2. Oxygen in soil

The amounts of components of air in the spaces in the soil change greatly with the type of soil, mode of cultivation, water content ratio, kinds of soil microorganisms, and growth of the plant root system. The proportions of oxygen and carbon dioxide in the air in the soil which have the closest relation to the growth of the root are listed below as compared with those of components of atmospheric air.

|                    | N    | $O_2$  | Ar  | $CO_2$   | Others |
|--------------------|------|--------|-----|----------|--------|
| Atmospheric air(%) | 78.1 | 20.9   | 0.9 | 0.03     | 0.07   |
| Air in soil(%)     | —    | 10-15  | —   | 0.2-0.5  | —      |

The root of the plant takes in the oxygen in the soil and gives off carbon dioxide through respiration. As the plant grows, the amount of oxygen consumed increases, but the diffusion of oxygen from the atmosphere into the soil is limited, this causing disorders of respiration to impair the growth and promote ageing.

3. Soil temperature

Soil temperature is influenced by the composition of soil, evaporation of water, water content of soil, atmospheric temperature and the like. The soil temperature changes markedly especially near the surface of soil. The ambient temperature of the root system exerts a great influence on the activity, physiological function and growth of cells of the plant. With soil culture, it is impossible to maintain the environment at a temperature physiologically suitable for the root system.

Briefly, with soil culture, natural environmental factors subject the root system to ever-changing conditions in respect of water, oxygen and temperature that are essential to the growth of plants and it is substantially impossible to provide optimum growing conditions. This causes various physiological disorders, hampers the growth of plants and production of crops and makes it impossible to simplify culture techniques. Furthermore, the ratio of water to air in the spaces in the soil is most critical to the growth of the root system and the optimum ratio differs with the type of plant. Where the ratio of water to air is optimum, the root respires satisfactorily to permit the root cells to exhibit excellent activity to take in water and nutrients to a full extent. However, the water to air ratio in the soil readily varies due to environmental changes and growth of the plant, frequently rendering the root susceptible to difficulty in respiration to arrest its growth. Furthermore, although the root requires increasing amounts of water, oxygen and nutrients with the growth of the plant, the growing root system in the soil reduces the spaces in its neighborhood, physically aggravating the environment to deteriorate the function and activity of the root and to reduce its ability to absorb water and nutrients.

To overcome these drawbacks of soil culture that fail to afford controlled growing conditions, soilless culture appears advantageous, but water culture, sand culture and gravel culture heretofore practiced have not achieved particularly excellent results as compared with soil culture, because these methods with soilless media do not give due consideration to the environment of the root system but rely simply on the nutrient solution and scanty dissolved oxygen in water, failing to supply sufficient oxygen as required with the growth of the plant and without employing means for maintaining the physiologically most suitable temperature for the root system. Whereas the atmosphere contains about 21% (210,000 ppm) of oxygen, the amount of dissolved oxygen in water is up to as low as 8.84 ppm, which is apparently insufficient for the respiration of the plant.

Briefly, the conventional methods of soil culture, water culture and the like can not provide an optimum environment for the root system based on correct recognition of the nature of the root system of each particular plant, the relation between the respiration mechanism of the root and underground environment, and the activity of the root system.

SUMMARY OF THE INVENTION

An object of this invention is to make it possible to artificially provide and maintain an underground environment which is most suitable for the growth of plants and which is naturally unavailable.

Another object of this invention is to enhance the activity of the root of the plant to assure an increased yield with high quality.

Still another object of this invention is to provide an apparatus for achieving the foregoing objects with ease.

To fulfil these objects, it is essential that the root system of a particular plant be subjected to conditions involving a specific water to air ratio peculiar to the plant. Because poor productivity would result if the environment is left to change as the plant grows, the growing conditions must be so maintained that such adverse result will be avoided. With soil culture, the ratio of water to air changes continuously depending on the degree of elevation of capillary water through the spaces in the soil, whereas with soilless culture, air and water are distinctly separated into two phases, i.e. upper and lower phases.

In view of the foregoing, there is provided means for controlling the water level so that the upper portion of the root system will be exposed to air (with the surfaces of the root cells in a wet state) while the lower portion thereof including its distal end will be positioned in water, the means permitting the desired amounts of the root system to be held in contact with water and with air respectively for a controlled period of time, such that the portion exposed to air can take in a large amount of air while permitting the underwater root portion to absorb water and nutrients as desired.

When water is supplied to plantation vessel, atmospheric air is forced into the water by bubbling to increase the amount of dissolved oxygen in water.

Further according to this invention, there is provided means for adjusting and controlling as desired the amount of oxygen to be absorbed by the root system by always moving the culture solution relative to the underwater root system. In the case of still water, the oxygen absorbing activity of the root reduces the amount of oxygen in the stagnant water around the root, whereas if the water is made to flow, the gradient of concentration of oxygen increases in the water around the root, permitting the root to absorb a greater amount of oxygen.

The present invention further provides means for maintaining the culture solution at a suitable temperature.

In brief, the present invention is characterized in that the optimum ratio of water to air as required by the root system is given, in terms of amount and time, by the ratio of the presence of the root in water to the presence of the same in air. More specifically, the duration for the root to be exposed to air and the amount of the root so exposed are controlled by controlling the interval of water supply and water level, so as to give the plant an optimum environment for the absorption of oxygen in accordance with the particular type of the plant and the stage of its growth. For the root portion positioned in water, the water is continuously caused to flow in a correlated fashion to enhance the ability of the underwater portion to absorb oxygen and to enable the cells thereof to absorb water and nutrients more actively. The use of water having high specific heat as a culture medium makes it possible to stably maintain the root system at a physiologically optimum temperature for the promotion and control of its physiological activity.

Consequently, the changes in the liquid level of the culture solution and the flow of the solution promote respiration of the root that is essential in keeping the plant alive, ensuring brisk growth and resistance to an unfavorable environment to give a high yield with high quality. Since it is possible to provide an optimum underground environment for the plant by controlling the liquid level of the culture solution in accordance with the type of plant and the stage of its growth, the growing plant is unlikely to suffer disorders, this making it feasible to grow plants on an industrial scale without the necessity for ingenious technique and experience.

The plants grown by the present method are free from respiratory disorder and exhibit active metabolism and therefore exceedingly promoted assimilation, so that plants can be grown even in weak sunlight. Moreover, high activity of the roots yields healthy plants having a high resistance to soil-borne diseases.

Because the root has an excellent ability to absorb water, leaves give off a greater amount of water vapor, with the result that in an event of high temperature, the plant is highly amenable to temperature control and is therefore less susceptible to damage due to high temperature.

Since the root system can be kept at a suitable temperature, the plant will be almost free from adverse effects caused by a cold atmospheric environment.

The fact that the root can be kept active over a prolonged period of time makes it possible to obtain crops over a long period through continuous cultivation. Control of the underground environment achieved by this invention further facilitates control over vegetative growth and reproductive growth.

Other objects and features of this invention will become more apparent from the following description.

DESCRIPTION OF THE PREFERRED EMBODIMENTS

Figure 1:
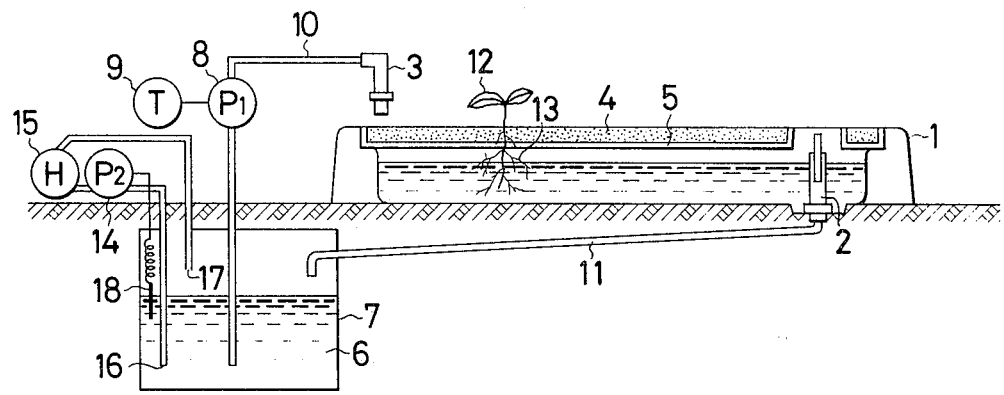
FIG. 1 is a sectional view showing an embodiment of a culture apparatus of this invention.

With reference to FIG. 1, a plantation vessel 1 has a plantation bed 5 which is packed with a culture medium 4 such as gravel, urethane foam or the like in which a plant 12 is grown. Disposed at the bottom of the vessel 1 is a drain regulator 2 from which a drain pipe 11 extends to a tank 7 containing a suitable amount of a culture solution 6. By means of a pump 8 which is driven at a suitable time interval by a timer 9, the solution 6 is supplied to the vessel 1 through a supply pipe 10 and a supply nozzle 3 equipped with an aerator. By way of a heater or cooler 15, a portion of the solution 6 within the tank 7 is recycled by a pump 14 coupled with a thermostat 18 to maintain the solution 6 at a temperature suitable to culture the plant 12.

Figure 2:
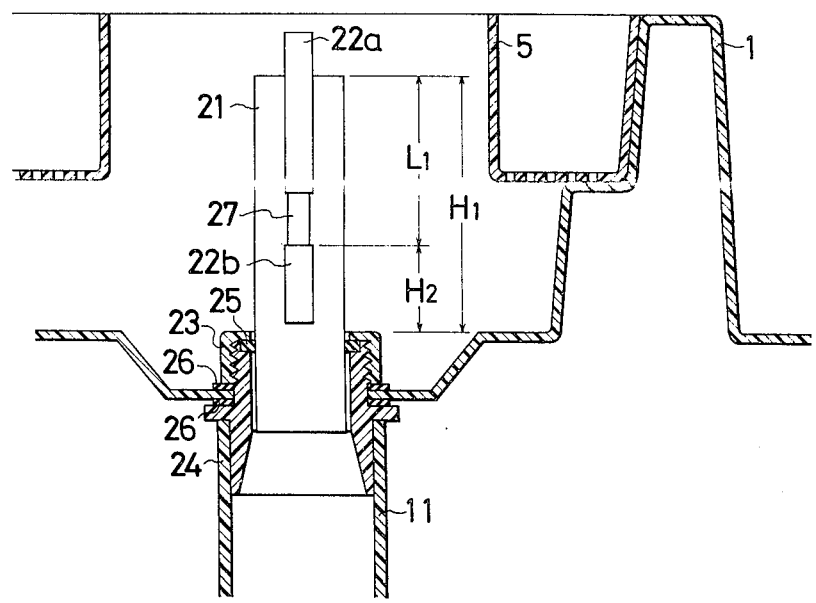
FIG. 2 is a sectional view showing an exemplary arrangement of a drain regulator.
Figure 3:
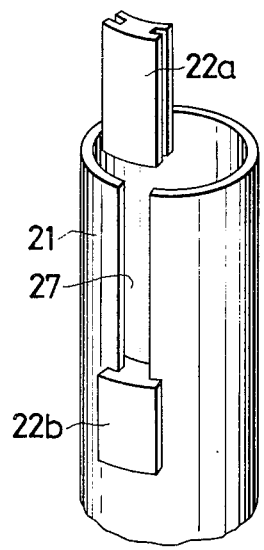
FIG. 3 is a fragmentary perspective view on an enlarged scale showing the drain regulator of FIG. 2.

Referring to FIG. 2, the drain regulator 2 has a drain tube 21 which is supported by a valve socket 24 in a watertight fashion with a packing 25 fitted thereon and which is adjustably movable up and down. The valve socket 24 is watertightly secured to the vessel 1 by a lock nut 23 and packings 26. As shown in FIG. 3, the portion of the drain tube 21 that projects into the vessel 1 is formed with a slit 27 extending from its upper end. A slide valve 22a is slidably watertightly fitted in the slit 27. A slide valve 22b positioned below the valve 22a is also fitted in the same slit to set the remain liquid level. The length $L_1$ of the slit 27 above the upper end of the valve 22b is equal to the difference between the highest liquid level $H_1$ and remain liquid level $H_2$. The valve 22b is interchangeable with one having the desired dimensions for the adjustment of the remain liquid level.

Figure 4:
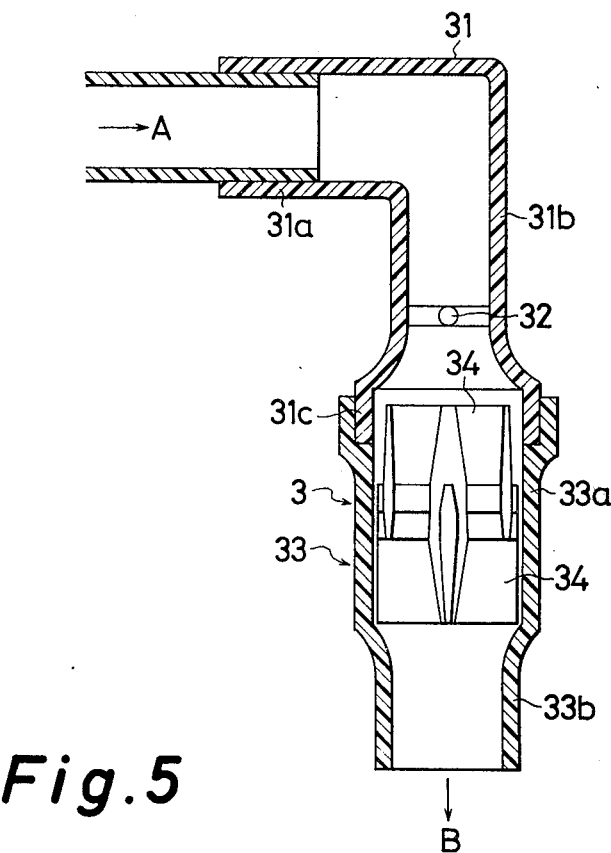
FIG. 4 is a sectional view showing an example of a supply nozzle equipped with an aerator.
Figure 5:
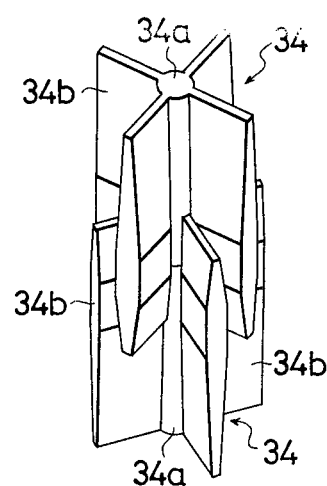
FIG. 5 is a perspective view showing an example of a slitter member in the nozzle of FIG. 4.

FIG. 4 shows an elbow 31 including a large diameter portion 31a joined with the supply pipe 10 and having an inner diameter greater than the inner diameter of a portion 31b joined with a nozzle portion 33. The small diameter portion 31b is formed with two air intake apertures 32 at a suitable position close to its opening. From the vicinity of the air intake apertures 32 toward the opening, the portion 31b flares outward with a smooth curved inner surface, and at the end of that opening, the elbow 31 has a joint portion 31c joined with the nozzle portion 33. At a portion 33a where the nozzle 33 is joined with the joint portion 31c, the nozzle 33 has an inner diameter equal to that of the joint portion 31c. The nozzle portion 33 is progressively constricted toward its outlet end 33b with a smooth inner surface having a progressively reducing diameter. The joint portion between the elbow 31 and the nozzle portion 33 accommodates a slitter member 34 disposed coaxially therewith. The slitter member 34 comprises an approximately spindle-like boss 34a and a plurality of blades 34b extending radially from the boss 34a and arranged at an equal space circumferentially thereof, with each of the blades 34b being tapered toward its upper and lower ends. In the illustrated embodiment (see FIG. 5), the slitter member 34 has eight blades disposed in staggered arrangement around the boss 34a, with each upper blade positioned at an angle of 45° with the adjacent lower blade. The slitter member 34 may be of a simpler construction. For instance, the boss may be provided with four radial blades disposed equidistantly circumferentially thereof.

Figure 6:
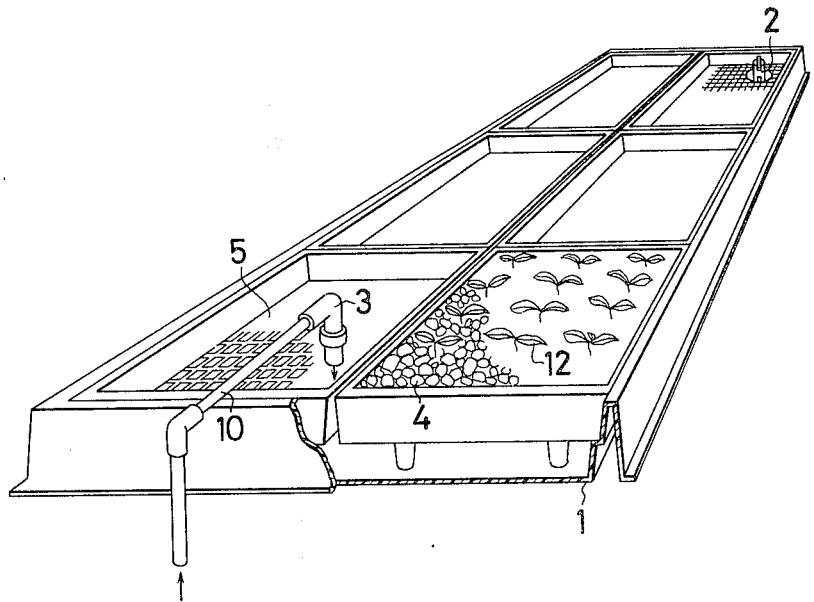
FIG. 6 is a perspective view showing an embodiment of a culture apparatus of this invention for growing leafy vegetables.
Figure 7A:
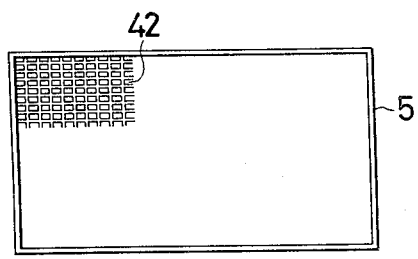
FIGS. 7a and b are views in plan and side elevation, respectively, of an example of a plantation bed.
Figure 7B:
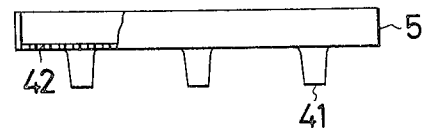

FIG. 6 shows another embodiment of this invention which is adapted to grow leafy vegetables. A plantation bed 5 containing a culture medium 4 is provided, in its bottom and side portions, with a great number of apertures 42 of a suitable size as seen in FIG. 7a such that the bed 5 will retain the medium 4 thereon but will not hinder the growth of roots 13 of the plants. In the illustrated embodiment, the aperture 42 is rectangular, but it may be circular or of any shape. Where desired, the plantation bed 5 may be provided on its bottom with legs 41 of a suitable length (FIG. 7b).

Figure 8:
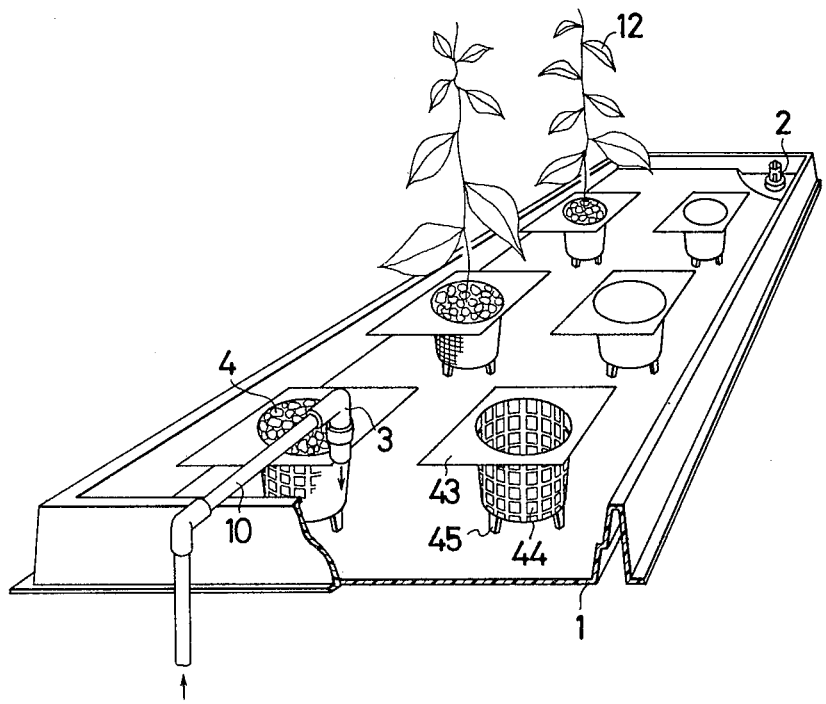
FIG. 8 is a perspective view showing an embodiment of a culture apparatus of this invention for growing fruit vegetables.

The embodiment shown in FIG. 8 for growing fruit vegetables employs plantation pots 43 for accommodating a culture medium 4 and plants 12. Like the plantation bed 5, the pot 43 is formed, in its side and bottom portions, with apertures 44 of a suitable size capable of retaining the medium 4 and permitting the growth of the roots 13 of plants. The pot 43 may have legs 45 of a suitable size on its bottom, if so desired.

Plants are grown in the following manner on the apparatus described. The culture solution 6 containing a suitable amount of water-soluble fertilizer is supplied from the tank 7 through the pipe 10 to the plantation vessel 1 at a specified interval for a specified period of time (for example for ten minutes once every hour) by the pump 8 coupled with the timer 9. When the culture solution is passed through the nozzle 3 equipped with the aerator and attached to the end of the supply pipe 10, the solution is introduced into the elbow 31 in the direction of arrow A as indicated in FIG. 4. The passage of the culture solution through the small diameter portion 31b produces a Venturi effect, by which air is drawn in through the air intake apertures 32. When the mixture of the solution and air thereafter flows through the position of the slitter member 34, the mixture is fully agitated by the blades 34b of the slitter member 34, whereby the air is satisfactorily incorporated into the culture solution. At this time, the flow of the fluid mixture is rectified by the tapered blades 34b and the spindle-like boss 34a and is discharged from the outlet of the nozzle portion 33 at a constant rate in the direction of arrow B. In this way, the culture solution 6 absorbs oxygen from the air to a full extent and is then supplied to the vessel 1. After the vessel 1 is filled to the liquid level $H_1$ at the upper end of the drain tube 21, excess solution flows into the drain tube 21 over the upper end thereof and returns to the tank 7 through the drain pipe 11. Accordingly, the liquid level is maintained at the highest point $H_1$ during the supply of the culture solution. After the supply of solution is interrupted, the liquid level progressively lowers and finally reaches the lowest level $H_2$ due to the outflow of the solution through the slit 27 in the drain tube 21. During this time, the discharge of the solution causes the solution to slowly flow through the vessel 1, subjecting the root surfaces of growing plants to the flow of the solution.

After the liquid level of the solution reaches the lowest level $H_2$ within the vessel 1 whereupon the liquid discharge is completed, the timer 9 actuates the pump 8 to start the subsequent supply operation. Thus, the culture solution continues to move within the vessel 1 all the time without interruption and, at the same time, the supply and discharge operation always refreshes the solution in the vessel 1.

During one cycle of liquid supply and discharge operation, a part or major portion of the root 13 may be exposed directly to air due to the drop of the liquid level. However, the intermittent ups and downs of the liquid level prevent the exposed root from drying.

To flow the culture solution at an increased rate within the vessel as desired, a greater amount of solution may be supplied in the beginning, followed by continuous supply at a lower rate, while the slit 27 may be opened to a greater extent to increase the flow rate.

The pump 14 coupled to the thermostat 18 operates to force up the culture solution 6 through a pipe 16, and the solution is then adjusted by the heater or cooler 15 to a temperature suitable for cultivation and is then returned to the tank 7 by way of a pipe 17.

Listed below are results of experiments achieved by varying liquid levels and drainage times.

|  | Tomato |  | Cucumber |  |
| --- | --- | --- | --- | --- |
| Highest liquid level (cm.) | 2 | 3 | 3 | 2 |
| Lowest liquid level (cm.) | 4 | 4 | 4 | 4 |
| Drainage time (min.) | 30 | 80 | 80 | 30 |
| Interval of liquid supply (min.) | 120 | 120 | 120 | 120 |
| Duration of exposure to air (min.) | 90 | 40 | 40 | 90 |
| Yield per plant | 7.5(kg.) | 2.7(kg.) | 40 | 16 |

It will be apparent from the above that a marked difference results in the productivity achieved, depending on whether the plant is exposed to air for an appropriate period of time in accordance with its type and the particular stage of its growth. Thus, whether the root can absorb oxygen with ease or not produces a great influence on the growth and the resulting yield.

What is claimed is:

1. An improvement in an apparatus for water and air culture comprising: a culture bed packed with a support for a plant and positioned at an upper level of a plantation vessel; a plantation vessel accommodating the culture bed to be supplied with a culture solution so that the solution may pass through a lower space of the culture bed; means for supplying the culture solution from a tank to the plantation vessel at one end thereof for a period of time controlled by control means including a timer, said supplying means including means for incorporating air into the culture solution while the solution is being supplied; a drain tube having means for regulating the highest and lowest liquid levels by an adjustable slot of the tube provided at the other end of the plantation vessel; and a tank for containing the culture solution of a temperature suitable for causing a plant to grow and for receiving the culture solution flowing out from the drain tube, the means for supplying the culture solution being provided with a nozzle having air intakes and slitter means, and positioned above the one end of the vessel.

* * * * *